United States Patent [19]

Fargo

[11] B 4,014,726

[45] Mar. 29, 1977

[54] PRODUCTION OF GLASS FIBER PRODUCTS

[75] Inventor: Harland E. Fargo, Newark, Ohio

[73] Assignee: Owens-Corning Fiberglas Corporation, Toledo, Ohio

[22] Filed: Mar. 18, 1974

[21] Appl. No.: 452,293

[44] Published under the second Trial Voluntary Protest Program on March 30, 1976 as document No. B 452,293.

[52] U.S. Cl. .................................. 156/167; 65/3 C; 65/4 R; 156/296; 156/328; 156/331; 156/335; 428/294; 428/302; 428/378; 428/391; 428/429; 428/436; 428/451

[51] Int. Cl.$^2$ ................... B32B 17/04; B32B 27/42

[58] Field of Search ............ 260/17.2, 29.3, 29.4 R, 260/29.4 UA; 117/126 GB, 126 GQ, 126 GN, 126 GE, 126 GS; 161/193, 206, 198, 208, 169, 170; 156/328, 329, 330, 335, 334, 166, 167, 296, 331; 65/3, 4, 3 C, 4 A, 4 R; 428/429, 436, 451

[56] References Cited

UNITED STATES PATENTS

| | | | |
|---|---|---|---|
| 3,167,468 | 1/1965 | Lovelace et al. | 428/378 |
| 3,481,771 | 12/1969 | Doering | 117/126 GQ |
| 3,616,181 | 10/1971 | Stalego | 117/126 GB |
| 3,684,467 | 8/1972 | Smucker | 65/3 |
| 3,689,300 | 9/1972 | Bunger et al. | 117/126 GQ |
| 3,705,073 | 12/1972 | Marzocchi et al. | 260/29.3 |
| 3,705,075 | 12/1972 | Marzocchi | 161/193 |
| 3,793,310 | 2/1974 | Elizer | 117/126 GQ |
| 3,823,103 | 7/1974 | Harding | 260/17.2 |

*Primary Examiner*—Harold Ansher
*Attorney, Agent, or Firm*—John W. Overman; Patrick P. Pacella; John C. Purdue

[57] ABSTRACT

The production of a bonded glass fiber product is disclosed. The steps of the method involve forming glass fibers from molten streams of glass; combining the glass fibers with a heat curable aqueous binder composition; consolidating the fibers and heat curable aqueous binder composition into a loosely packed mass on a foraminous conveyor; and curing the heat curable binder composition in situ on the glass fiber product. The consolidated fibers can be compressed on the foraminous conveyor prior to or during curing of the binder composition, or both. The binder composition comprises:

1. 60–95 percent by weight of a complex polymeric component formed by reacting phenol, formaldehyde, a modifier selected from the group consisting of starch and compounds which are degradation products of starch, and urea,
2. 10–80 percent of urea based upon the weight of the phenol originally charged to produce the polymeric component,
3. 0.5–25 percent of a lubricant based on the total weight of the complex polymeric component and any unreacted area,
4. 0.1–1 percent of a silane, based on the total weight of the complex polymeric component and any unreacted urea,
5. 0.2–3.0 percent of an ammonium salt of a strong acid based on the total weight of the complex polymeric component and any unreacted urea, and
6. water, to dilute the binder to a desired solids content of from 1–40 percent.

6 Claims, No Drawings

PRODUCTION OF GLASS FIBER PRODUCTS

BACKGROUND OF THE INVENTION

The present invention is an improvement over the invention disclosed and claimed in U.S. Pat. No. 3,684,467. Both inventions are concerned with providing phenolic binder compositions which can be used in producing glass fiber products of the wool-like and board types, which binder compositions are especially formulated: (1) to minimize the total air pollution occasioned by use thereof in producing glass fiber products and (2) to keep the percentage of especially noxious pollutants, phenol and formaldehyde, in particular, as low as possible. In both cases, a part of the method involves using a higher than normal molecular proportion of formaldehyde to phenol in carrying out an initial phenol-formaldehyde condensation; as a consequence of the high mole ratio, free phenol is reduced to a minimum during this initial condensation. A second reactant which is also condensable with formaldehyde is then added, according to both inventions, and further condensation occurs. Urea is added according to both inventions and there is limited condensation between the added urea and the previously formed condensate. In the case of the prior art process, the second reactant capable of condensation with formaldehyde is dicyandiamide.

BRIEF DESCRIPTION OF THE INVENTION

The present invention is based upon the discovery that the prior art condensates briefly described above can be improved in several significant respects by substituting, for the dicyandiamide, starch or a compound which is a decomposition product of starch. The compound which is a decomposition product of starch can be dextrose (a $C_6$ sugar) or a solution thereof in water, usually called a glucose solution, or can be an intermediate between starch and dextrose, e.g., dextrin.

The use of starch or of a compound which is a degradation product of starch instead of dicyandiamide results in several important benefits:

1. Laboratory scale work indicates that, other factors being equal, the total amount of emissions will be reduced.
2. The amount of phenol, currently a scarce petrochemical, required per gallon of binder is reduced.
3. The free formaldehyde content of the finished resin is lowered.
4. The tendency for the resin to form trimethylol phenols in storage is reduced.
5. The necessity for adjusting the binder resin to a substantially neutral pH for storage is avoided.
6. The use of the resin will enable energy savings because the binder cures more rapidly, as a consequence, the temperatures of curing ovens can be lowered or the rate at which product is cured can be increased, resulting, in either case, in energy savings; and
7. Reactor capacity is effectively increased, because the binder resin can be produced at higher solids content.

There are substantial savings in practicing the instant invention as a consequence of the elimination of the need for adjusting the polymeric component to a substantially neutral pH for storage: (1) the sulfuric or other acid previously used to make this pH adjustment is no longer required, and (2) the ammonium hydroxide previously required to stabilize binders made from the substantially neutral resins is no longer needed. In addition, problems which have been encountered with precipitates formed as a consequence of the neutralization step (particularly when calcium hydroxide has been used as the condensing agent, and the pH adjustment has been made with sulfuric acid, forming calcium sulfate) are eliminated.

Still further savings are realized when the instant invention is practiced because, in essence, a comparatively inexpensive product, i.e., starch or a degradation product of starch, is substituted for a comparatively expensive compound. For example, in early 1974, starch and degradation products of starch are eight to ten cents per pound, while dicyandiamide is a forty cent per pound product.

DESCRIPTION OF THE PREFERRED EMBODIMENTS

The following Examples illustrate preferred embodiments of the present invention. Example 1 illustrates the best mode presently known to the inventor. In the Examples, as elsewhere herein, including the appended claims, the terms "percent" and "parts" refer to percent and parts by weight, unless otherwise indicated.

EXAMPLE 1

A mixing tank provided with a propeller-type agitator was charged with 10 parts of water, and the water and subsequently charged ingredients were stirred during the formulation of a binder composition according to the invention. A 0.04 part portion of sodium hexametaphosphate and a 0.004 part portion of an aminoalkylsilane* were added to the tank, followed by a 0.07 part portion of ammonium sulfate, a 1.86 part portion of a 50 percent aqueous solution of urea, a 7.46 part portion of a Condensate A**, and a 0.05 part portion of an oil emulsified with a non-ionic surfactant. Sufficient additional water was added to provide a binder composition of 16 percent solids.

* The particular aminoalkylsilane used had the formula $NH_2C_2H_4NHC_3H_6Si(-O\,CH_2CH_3)_3$. ** Subsequently identified.

The binder composition produced as described in the preceding paragraph was sprayed into a region through which glass fibers were being projected onto a foraminous conveyor. The fibers were collected in the form of a wool-like mass associated with the binder composition. The relative proportions of binder composition and fibers were such that the binder, after cure thereof, constituted approximately 11 percent of the total product. Cure was accomplished in an oven maintained at a temperature of about 400°F. through which the glass fibers and associated binder were passed in a period of about two minutes, and in which the product was compressed sufficiently that the final product was a board-like mass of glass fibers bonded to one another at points of contact by a resite formed by cure of the binder composition, and had an apparent density of about nine pounds per cubic foot, on the average.

The glass fiber product produced as described in the preceding paragraph had substantially the same properties and characteristics as an analogous product made from a binder containing a condensate prepared by the procedure described in U.S. Pat. No. 3,684,467, column 8, lines 1–27.

Condensate A was prepared from 363.6 parts 52 percent formaldehyde, 160 parts phenol, 52 parts water, 14.4 parts calcium hydroxide, 48 parts dextrin and 160 parts 50 percent urea solution in water. The condensate was produced in a stainless steel reactor equipped with a propeller-type agitator and an interior, indirect heat transfer coil through which steam or cooling water was circulated, as required, to control temperature. Agitation was used throughout. The phenol and formaldehyde were added to the reactor first, and were heated to 110°F., which temperature was maintained for 3½ hours, during which time the calcium hydroxide, as a slurry in the water, was added gradually. The reaction mixture was then heated to 125°F. and maintained at that temperature for a period of one hour counting the time, approximately ten minutes, required to reach 125°F. The temperature was then increased to 150°F., and that temperature was maintained for a total of 2½ hours. The dextrin was charged two hours after the reaction mixture reached 150°F. At the end of the 2½ hour period at 150°F., cooling water was circulated through the indirect heat exchanger to lower the reaction temperature, and the urea solution was added rapidly. Cooling water was circulated until the condensate reached a temperature of about 80°F.

The proportion of volatiles in Condensate A was found to be 20 units, as measured by an arbitrary test which has been found to correlate well with emission experience under commercial conditions when binders made with that resin are being used. The test involves distilling a predetermined volume of the resin, diluted to about 25 percent solids with distilled water, collecting the distillate, and determining colorimetrically the proportion of low molecular weight condensates in the distillate collected. Volatility is then determined by reference to an empirical chart. The correlation between emissions, under commercial conditions, and "volatility" of a resin by the test just described, occurs in the sense that resins which are found to have low volatility are found to give fewer emissions under commercial conditions, other factors being equal, than do resins which are found to have a high volatility.

A condensate prepared by the procedure described in U.S. Pat. No. 3,684,467, column 8, lines 1-27, using barium hydroxide as the condensing agent and formaldehyde and phenol in a mole ratio of 3.1:1 had a volatility of 200 units by the test described above, while the same condensate, produced with calcium hydroxide as the condensing agent, had a volatility of 85.

In the procedure described above for producing Condensate A, urea was added to the phenol-dextrin-formaldehyde condensate during cooling thereof. This is a preferred procedure, because an adequate degree of reaction between the added urea and formaldehyde, partial condensates or both in the reaction mixture occurs during the cooling. The same result can be achieved, however, by any other procedure according to which at least 5 percent of urea, based upon the weight of the phenol originally charged, is dissolved in the condensation products for at least 15 minutes at a temperature of at least about 90°F. For example, Condensate A could be cooled to about 80°F. without making any urea addition. The condensate could then be reheated, and the urea could be added. Alternatively, a binder could be formulated from the phenol-dextrin-formaldehyde condensate and urea, and the binder can be aged for at least 15 minutes at a temperature of 90°F. or higher to provide the requisite degree of reaction.

Reaction between added urea and formaldehyde is required in order to minimize the low molecular weight binder constituents used in producing glass fiber products and, as a consequence, to minimize the volatiles in the binder and effluent from the process.

It has been found that a part of the phenol-dextrin-urea-formaldehyde or the like condensate can be replaced by a comparatively high molecular weight additive reactive with formaldehyde in order to reduce still further the volatiles in a glass fiber binder system. Lignin sulfonate, a by-product of the paper industry, polyvinyl acetate, polyvinyl alcohol and mixtures thereof can all be used for this purpose. These materials, usually in an amount ranging from 5 to 25 percent, based upon total solids, can be added to the condensate during cooling, as described above for the urea addition, or can be used in formulating binders according to the invention. Examples of binders containing lignin sulfonate and polyvinyl acetate which can be produced and used in connection with the production of glass fiber products as described above in Example 1 are given in the following Table:

TABLE I

| | Example 2 | Example 3 |
|---|---|---|
| Water | (As in Example 1) | (As in Example 1) |
| Sodium hexametaphosphate | 0.03 part | 0.03 part |
| Gamma-aminopropyltriethoxysilane | 0.01 | 0.01 |
| Ammonium sulfate | 0.05 | 0.05 |
| Condensate A | 6.06 | 6.06 |
| Lignin sulfonate | 0.70 | — |
| Polyvinyl acetate | | 0.70 |
| 50% aqueous solution of urea | 1.86 | 1.86 |
| Oil emulsified with non-ionic surfactant | 0.23 | 0.23 |

It has been found that starch derivatives other than dextrins can be used in the manner described above in connection with the preparation of Condensate A, and that starch itself can be so used, although the condensates have a somewhat higher viscosity when made with starch, rather than a starch derivative, so that larger quantities of more dilute binders should be used when the condensate is starch modified, as distinguished from modified with a starch derivative. Starch derivatives including dextrose are all equally operable in practicing the instant invention, and whether made enzymatically, by heating an aqueous system under acid conditions, an aqueous system under basic conditions or by a combination of heat and pressure under acid or basic conditions.

Optimum results have been achieved using, as the silane coupling agent, aminoalkylalkoxysilanes, for example those listed in U.S. Pat. No. 3,684,467.

What I claim is:

1. A method of preparing a bonded glass fiber product comprising the steps of:
   a. forming glass fibers from molten streams of glass;
   b. combining the glass fibers with a heat curable aqueous binder composition comprising
      1. 60–95 percent by weight of a complex polymeric component formed from a reaction mixture consisting of phenol, formaldehyde, a modifier selected from the group consisting of starch and compounds which are degradation products of starch, and urea, wherein said polymeric component is produced by:

a. charging a reactor with a mixture of formaldehyde and phenol in a mole ratio of formaldehyde/phenol of from 2.9–4.2/1;
b. reacting the mixture in the presence of a condensing agent until it has a free formaldehyde content of from 7–15 percent of the total weight of formaldehyde, phenol and water;
c. adding to the reactor the starch or starch decomposition product in an amount ranging from 5 to 50 percent of the phenol charged; and
d. cooling the reactor contents;

2. 10–80 percent of urea, based upon the weight of the phenol originally charged to produce the polymeric component, with the proviso that at least 5 percent of urea, based upon the weight of the phenol originally charged to produce the polymeric component is dissolved in the polymeric component for at least fifteen minutes at a temperature of at least 90°F.

3. 0.5–25 percent of a lubricant based upon the total weight of the complex polymeric component and any unreacted urea, 4. 0.1–1 percent of a silane, based on the total weight of the complex polymeric component and any unreacted urea, 5. 0.2–3.0 percent of an ammonium salt of a strong acid based on the total weight of the complex polymeric component and any unreacted urea, 6. water, to dilute the binder to a desired solids content of from 1–40 percent, c. consolidating the fibers and heat curable aqueous binder composition into a loosely packed mass on a foraminous conveyor; and d. curing the heat curable binder composition in situ on the glass fiber product.

2. A method as claimed in claim 1 wherein the third-named reactant (C) used to produce the complex polymeric component is a starch degradation product containing dextrose.

3. A method as claimed in claim 2 wherein the third-named reactant is dextrin.

4. A method as claimed in claim 1 wherein the binder composition additionally contains from 5–25 percent of lignin sulfonate, polyvinyl acetate, polyvinyl alcohol or a mixture of at least two thereof.

5. A method as claimed in claim 1 wherein at least 20 percent of urea, based upon the weight of the phenol originally charged to produce the polymeric component, is added to the reactor during the cooling step, and is dissolved in the polymeric component for at least 15 minutes at a temperature of at least 90°F. while in the reactor.

6. A method as claimed in claim 5 wherein at least 20 percent of unreacted urea, based upon the weight of the phenol originally charged to produce the polymeric components, is mixed with the polymeric component and other ingredients in producing the binder.

* * * * *